United States Patent

Huget et al.

[15] 3,675,327
[45] July 11, 1972

[54] FILLED COLD-CURING ACRYLIC RESIN AS A SPLINTING MATERIAL

[72] Inventors: Eugene F. Huget, Rockville; Gerhard M. Brauer, Bethesda; John W. Kumpula, Rockville; Simon Civjan, Silver Spring, all of Md.

[73] Assignee: The United States of America as represented by the Secretary of the Army

[22] Filed: Jan. 13, 1970

[21] Appl. No.: 2,588

[52] U.S. Cl. ..................................................32/6
[51] Int. Cl. ..................................................A61c 13/00
[58] Field of Search ..................................32/6, 2

[56] References Cited

UNITED STATES PATENTS 1,524,409   1/1925   Simmons ..................................32/13
3,348,311   10/1967  Weissman ..................................32/6
3,395,455   8/1968   Oveeby et al. ..........................32/6

*Primary Examiner*—Robert Peshock
*Attorney*—Charles K. Wright, Jr., William G. Gapcynski and Lawrence A. Neureither

[57] ABSTRACT

This disclosure describes a composition of matter made up of approximately 50 percent by weight calcium carbonate, approximately 50 percent by weight polymethylmethacrylate plus sufficient methyl methacrylate monomer to form a dough. This filled acrylic resin composition is useful in dental splinting methods. Also disclosed is a dental splinting method employing this filled acrylic resin composition in combination with interproximal pins and an elastic connector.

6 Claims, 3 Drawing Figures

PATENTED JUL 11 1972 3,675,327

INVENTORS
EUGENE F. HUGET
GERHARD M. BRAUER
JOHN W. KUMPULA
SIMON CIVJAN

BY Charles K Wright Jr
ATTORNEY

FILLED COLD-CURING ACRYLIC RESIN AS A SPLINTING MATERIAL

The invention described herein may be manufactured and used by or for the Government for governmental purposes without the payment to us of any royalty thereon.

BACKGROUND OF THE INVENTION

1. Field of the Invention

This invention relates to the field of filled acrylic resins useful as dental splinting materials, and to methods of using the filled resins for such purposes. This invention also relates to methods of using filled acrylic resins as dental splints in combination with interproximal pins placed between selected teeth and connected together with elastic connecting means.

2. Description of the Prior Art

The stabilization of alveolar fractures and avulsed, subluxated and reimplanted teeth by acrylic splinting devices has been described before. See G. Freedman et al., *J. Am. Dental Assoc.*, 76:785 (1968) and W. Johnson et al., *Periodontal Abstract*, 14:153 (1966). The use of auto-polymerizable acrylics presents an intriguingly simple and rapid means of achieving the required degree of stability for fixation purposes. The excessive heat evolved during the polymerization of these substances and the accompanying patient discomfort and soft tissue damage have, however, limited their use. The "rebound" tendency of acrylics in dough form and intraoral manipulation problems related to the use of more fluid mixes have also limited the scope of acceptance of auto-polymerizable acrylic splints.

SUMMARY OF THE INVENTION

This invention provides a composition of matter comprising substantially one-half by weight calcium carbonate filler, substantially one-half by weight polymethylmethacrylate, and sufficient methyl methacrylate monomer to form a dough. The composition may include a small amount of a polymerization initiator and a small amount of a polymerization accelerator.

This invention also provides processes of using filled acrylic resin compositions as dental splints. One of such dental splinting processes comprises placing interproximal pins between selected adjacent teeth, applying in contact with the teeth and pins a dough-like filled acrylic resin, allowing the resin to cure, and then interconnecting the ends of the pins with an elastic connector.

This invention also provides a construction for dental splinting comprising interproximal pins situated between selected adjacent teeth in the upper jaw and in the lower jaw, a cured filled acrylic resin composition located longitudinally alongside the teeth and in contact with them, wherein part of the exterior end portions of the pins extend outward from the surface of the acrylic resin material, and at least one elastic connector engaging exterior end portions of the upper pins and exterior end portions of the lower pins. The interproximal pins that form a part of this invention are noncorroding metallic bifurcated interproximal pins. In general, they comprise an elongated portion connected to a bifurcated portion.

Accordingly, it is an object of this invention to provide filled acrylic resin compositions useful as dental splinting materials which have the properties of ease of manipulation and minimal temperature rise during curing, and which, when cured, are nonelastic and rigid.

Another object of this invention is to provide a filled acrylic resin composition wherein the filler is calcium carbonate and the acrylic resin is polymethylmethacrylate.

Another object of this invention is to provide a process of dental splinting using a filled acrylic resin composition with the properties of ease of manipulation and minimal temperature rise during curing, and which, when cured, is nonelastic and rigid.

A further object of this invention is to provide a construction for dental splinting comprising interproximal pins situated between selected adjacent teeth, a cured filled acrylic resin composition, which is nonelastic and rigid, holding the interproximal pins securely in place, and a means for engaging the ends of the interproximal pins in order to immobilize the jaw.

Finally, it is an object of this invention to provide an interproximal pin for use in dental splinting which has a bifurcated portion to achieve secure placement between adjacent teeth and an elongated portion to provide an anchor for connectors engaging the ends of other interproximal pins.

DETAILED DESCRIPTION OF THE INVENTION

Description of the Splinting Compositions

Figure 1:
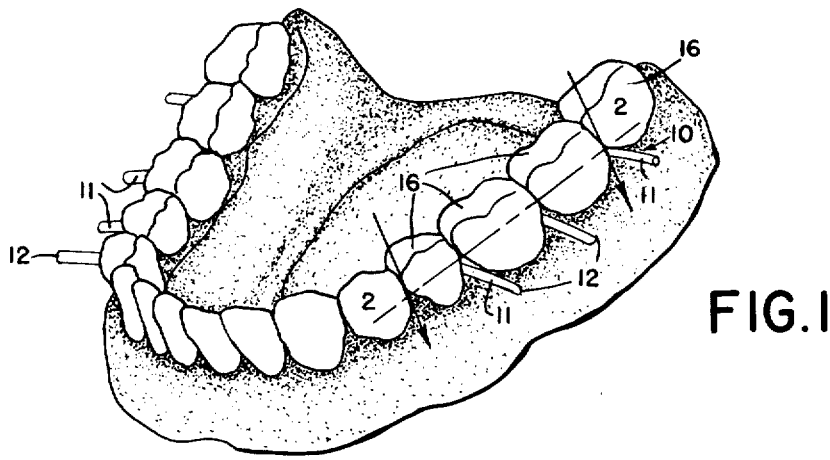
FIG. 1 is a perspective view of the lower jaw and teeth of a human illustrating the placement of preformed interproximal pins between selected teeth.

The calcium carbonate used was USP precipitated calcium carbonate with a particle size of 1 – 10 microns. Polymethylmethacrylate polymer powder and calcium carbonate filler were mixed by tumbling weighed amounts of the constituents in glass jars. If a faster curing product was desired, a small amount of a polymerization initiator was added to the blended powders. The preferred polymerization initiator was benzoyl peroxide. When using benzoyl peroxide polymerization initiator as in Example 1, below, the polymer - filled powder was blended with 0.2 percent by weight benzoyl peroxide by suspending the polymer and filler in a solution of the benzoyl peroxide in ethyl ether, followed by evaporation of the solvent.

The polymer-filler blend was made into a dough by mixing in sufficient methyl methacrylate liquid monomer (inhibited with 35 ppm butylated hydroxy-toluene) containing 0.2 – 0.5 percent by weight of an amine polymerization accelerator. The preferred amine polymerization accelerator was N,N - dimethyl - para - toluidine. At room temperature the monomer - polymer slurries reached the dough stage of polymerization in less than one minute after mixing. Cylindrical segments of dough (approximately 20 mm. in length and 4 mm. in diameter) were then placed in the muco-buccal folds of volunteer patients for definitive evaluation of heat tolerance. Ratios of 1.5 – 1.7 gm. of polymer-filler blend to 1.0 ml. of monomer liquid provided practical amounts of material for evaluation of dough stage manipulative characteristics, hardening time and heat evolution.

EXAMPLE 1

In accordance with the general methods explained above, a blend of polymer and filler, with the following proportions was prepared:

| | |
|---|---|
| polymethylmethacrylate | 49.8% by weight |
| calcium carbonate | 50.0% by weight |
| benzoyl peroxide | 0.2% by weight |

The dough prepared by the addition of sufficient methyl methacrylate monomer containing 0.2 percent N,N - dimethyl - para - toluidine accelerator gave an excellent splint material. The hardening time from the time the dough stage was reached was 6 minutes, the temperature rise during curing was minimal, and the dough readily formed into rope. It was adaptable to teeth, and the cured material was rigid and nonelastic.

EXAMPLE 2

In accordance with the general methods explained above, a blend of polymer and filler with the following proportions was prepared:

| | |
|---|---|
| polymethylmethacrylate | 50.0% by weight |
| calcium carbonate | 50.0% by weight |

The dough prepared by the addition of sufficient methyl methacrylate monomer containing 0.2 percent N,N - dimethyl - para - toluidine accelerator gave an excellent splint material. The hardening time from the time the dough stage was reached was ten minutes, the temperature rise during curing was minimal and the dough readily formed into rope. It was adaptable to teeth, and the cured material was rigid and nonelastic. The formulation in this example did not contain additional benzoyl peroxide polymerization initiator. Therefore, it had a slightly longer hardening time than Example 1, above, but otherwise the composition was the same as Example 1.

PHYSICAL AND MECHANICAL PROPERTIES

The cured product in Example 1, above, was tested for its physical and mechanical properties. Sorption, solubility and color stability, were determined according to American Dental Association Specification No. 12 for denture base polymer; transverse deflection by American Dental Association Specification No. 13 for denture cold curing repair resin; hardening time and temperature rise by American Dental Association Specification No. 17 for denture base temporary relining resin. Ultimate compressive strength was determined as prescribed by American Dental Association Specification No. 9 for dental silicate cement. Tensile strength was measured by the diametral method using disc shaped specimens one-fourth inch in diameter and one-sixteenth inch in thickness without platen modification as recommended by Civjan and de Simon, *IADR* 45the *General Meeting, Program, and Abstracts*, 1967, p. 126. Shear strength was determined by the "punch" method with use of disk-shaped specimens one-half inch in diameter and one-sixteenth inch thick. All strength determinations were performed on a Universal testing machine with an electric strain gauge load cell operated at a crosshead speed of 0.02 inches per minute.

The cured product had the following physical and mechanical properties:

a. Physical properties (average values of 2 specimens):
Sorption —— 0.4 mg/cm$^2$
Solubility —— 0.02 mg/cm$^2$
Color stability —— no perceptible change
Peak temperature — 50° C.
Hardening time —— 12 minutes
b. Mechanical properties (average values of 5 specimens):
Transverse deflection under
1,500 – 2,500 gm. load —— 1.1 mm.
Shear strength —— 5,700 psi
(standard deviation = 160 psi)
Tensile strength —— 2,450 psi
(standard deviation 200 psi)
Compressive strength —— 8,850 psi
(standard deviation 350 psi)

The hardening time of 12 minutes reflects the influence of the geometry of the polymerizing mass (required in the specification test) on polymerization characteristics. Disc shaped specimens 60 mm. in diameter and 2 mm. in thickness required twice as much time for polymerization as cylindrical specimens approximately 90 mm. in length and 6 mm. in diameter. Rupture of transverse deflection specimens at loads of 2,500–2,600 gm. was the result of the high percentage of inorganic filler. For clinical use, the CaCO$_3$ filled acrylic has demonstrated adequate rigidity and strength for splint fabrication. With the exception of the fracture of the material in the transverse deflection test, this material possesses properties similar to those associated with denture cold-curing repair resins.

Dental Splinting Methods

The advantages of our filled acrylic resin splinting compositions over the prior art products are their low heat of polymerization and their ease of manipulation. Our splinting compositions are ideal for the stabilization of alveolar fractures and avulsed, subluxated and fractured teeth. They can also be used for the stabilization of implants and reimplants. The method of applying dental splints for these aforementioned purposes is well known in the art, and reiteration of these methods is unnecessary. See G. Freedman et al., *J. Am. Dental Assoc.*, 76 : 785 (1968); D. Law, *Dent. Clin. N. Amer.*, Nov. 1961, p. 615; T. Lewis et al., *J. Dent. Child.*, 31 : 103 (1964); and W. Johnson et al., Periodont, Abstracts, 14 : 153 (1966).

Our dental splinting compositions may be advantageously employed in a novel method of maxillomandibular fixation and stabilization in mandibular fractures. This method may be illustrated in the accompanying figures. FIG. 1 shows a perspective view of a patient's lower jaw and teeth 16. Placed between the teeth are interproximal pins 10. The elongated exterior end portions 11 of the interproximal pins 10 extend outward from the teeth 16. The interproximal pins are made of a metallic material giving the pins a spring-like flexibility. Hence, the pins must be slightly compressed before they can be placed interproximally between adjacent teeth. The spring-like flexibility results in a secure placement of the pins between adjacent teeth.

Figure 2:
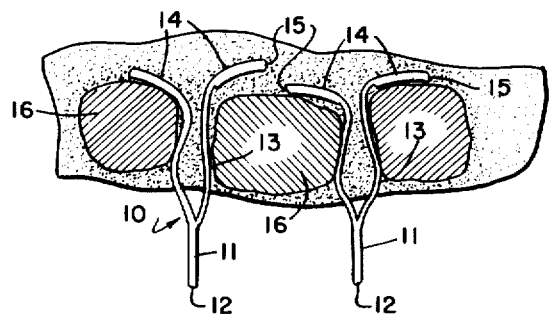
FIG. 2 is a horizontal cross-sectional view taken along line 2—2 of FIG. 1 illustrating the interproximal pins in greater detail.

The interproximal pins 10 are shown in detail in FIG. 2, a horizontal sectional view through line 2—2 of FIG. 1. In FIG. 2, the teeth 16 are shown by the hatched areas. An interproximal pin comprises an elongated exterior end portion 11 terminating in a blunt exterior tip 12, a bifurcated central portion 13 which is generally V-shaped, and an interior end portion 14 wherein the two branches each terminate in a curved doubled over portion with a blunt interior tip 15. The exterior tip 12 and the interior tips 15 should not be sharp or jagged. The interproximal pin may be constructed from any suitable noncorroding metallic stock material. Phospho-bronze stock material is an example of a suitable choice.

Figure 3:
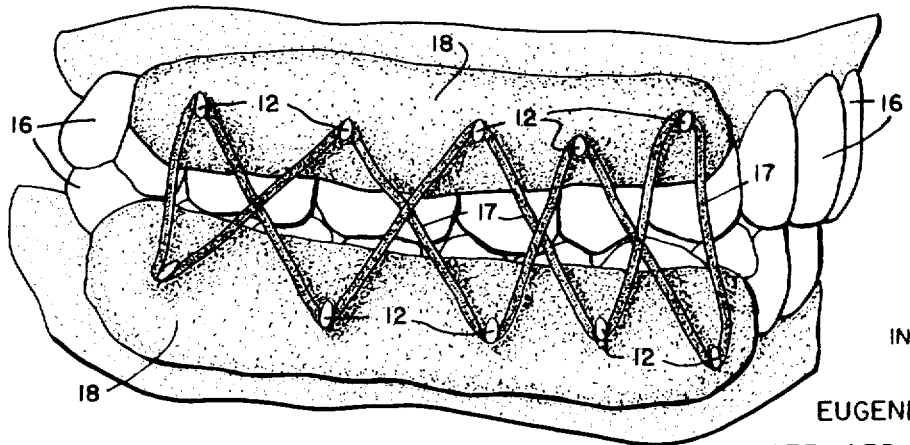
FIG. 3 is a side elevational view of an upper and lower human jaw with a cured dental splinting composition in place alongside the upper and lower teeth and an elastic connector engaging the exterior end portions of the interproximal pins extending out from the splinting material.

FIG. 3 shows a complete construction where a filled acrylic resin splinting composition 18, prepared as described above under "Description of the Splinting Compositions," has been placed longitudinally alongside the upper teeth and the lower teeth, and then allowed to cure. The splinting composition 18 is placed alongside the teeth 16 while the composition is of a dough-like consistency. The exterior tips 12 and a part of the exterior end portions of the interproximal pins extend outward from the surface of the splinting composition. After the short period of time required for the curing of the splinting composition 18, an elastic connector 17 is placed over the exterior tips 12 and exterior end portions of the interproximal pins. The elastic connector 17 may engage the exterior end portions in a diagonal manner engaging exterior end portions of upper and lower pins which are angularly displaced relative to each other, as seen in FIG. 3. The cured splinting composition 18 provides a nonelastic rigid product which securely holds the interproximal pins which in turn serve as anchor points for the elastic connector 17. The cured acrylic resin also prevents lingual displacement of the interproximal pins.

The characteristics and properties of our filled acrylic resin compositions suggest their usefulness in nondental as well as dental procedures. Nondental applications may possibly include fabrication of orthopedic appliances, stabilization of surgical implants, and replacement of portions of the calvarium after craniotomy.

We claim:
1. A process of dental splinting comprising:
a. preparing a dough-like filled acrylic resin comprising substantially one-half by weight calcium carbonate, substantially one-half by weight polymethylmethacrylate, and sufficient methyl methacrylate to form a dough-like substance;

b. applying in contact with the teeth said dough-like filled acrylic resin; and
c. allowing said filled acrylic resin to cure and harden.

2. A process of dental splinting comprising:
a. placing preformed, noncorroding metallic interproximal pins between selected adjacent teeth;
b. applying in contact with the teeth and pins a dough-like filled acrylic resin, leaving the ends of the pins uncovered;
c. allowing the filled acrylic resin to cure and harden; and
d. interconnecting the ends of the pins with at least one elastic connecting means.

3. The process of claim 2 wherein said dough-like filled acrylic resin comprises substantially one-half by weight calcium carbonate, substantially one-half by weight polymethylmethacrylate and sufficient methyl methacrylate to form a dough-like substance.

4. A construction for dental splinting comprising:
a. interproximal pins situated between selected adjacent teeth in the upper jaw and in the lower jaw;
b. a cured, filled acrylic resin composition located longitudinally alongside the teeth and in contact with them, wherein part of the exterior end portions of the pins extend outward from the surface of the acrylic resin material; and
c. at least one elastic connector engaging exterior end portions of the upper pins and exterior end portions of the lower pins.

5. The construction of claim 1 wherein the elastic connector engages exterior end portions of upper and lower pins which are relatively angularly displaced.

6. A noncorroding metallic bifurcated interproximal pin for use in dental splinting comprising:
a. an elongated portion having a blunt tip; and
b. a bifurcated portion connected to said elongated portion, wherein said bifurcated portion has a generally V-shaped configuration and the furcated portions each terminate in an outwardly curving portion.

* * * * *